(No Model.) 2 Sheets—Sheet 1.

M. L. BABB.
HOSE AND PIPE COUPLING.

No. 367,578. Patented Aug. 2, 1887.

Witnesses:
J. J. Isley
E. B. Cummings

Inventor:
Marshal L. Babb
By his atty
Herbert G. Briggs (No Model.)
2 Sheets—Sheet 2.

M. L. BABB.
HOSE AND PIPE COUPLING.

No. 367,578.  Patented Aug. 2, 1887.

Witnesses:
F. J. Ilsley
E. P. Cummings

Inventor:
Marshal L. Babb
By his Atty
Herbert G. Briggs

United States Patent Office.

MARSHAL L. BABB, OF PORTLAND, MAINE, ASSIGNOR OF ONE-HALF TO JONAS HAMILTON, OF SAME PLACE.

HOSE AND PIPE COUPLING.

SPECIFICATION forming part of Letters Patent No. 367,578, dated August 2, 1887.

Application filed April 4, 1887. Serial No. 233,604. (No model.)

*To all whom it may concern:*

Be it known that I, MARSHAL L. BABB, residing at Portland, in the county of Cumberland and State of Maine, have invented certain new and useful Improvements in Hose and Pipe Coupling; and I do hereby declare that the following is a full, clear, and exact description of the invention, which will enable others skilled in the art to which it appertains to make and use the same.

Figure 1:
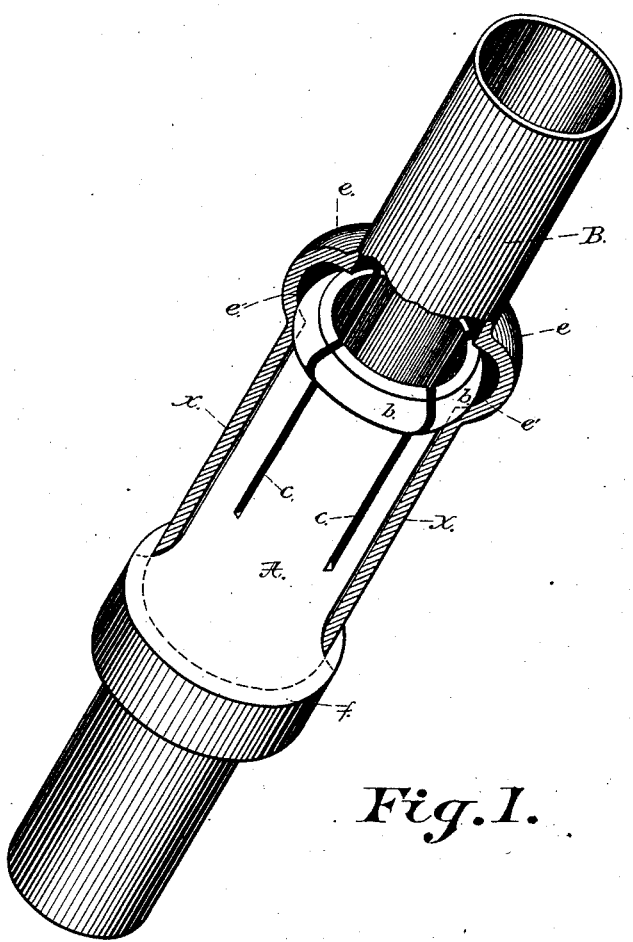
Figure 2:
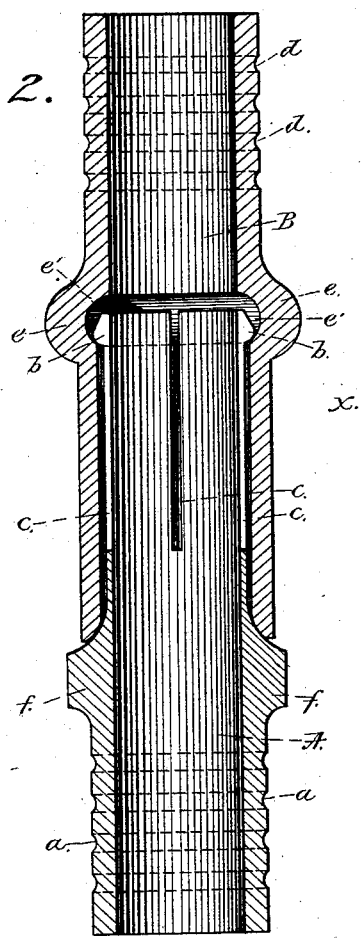
Figure 3:
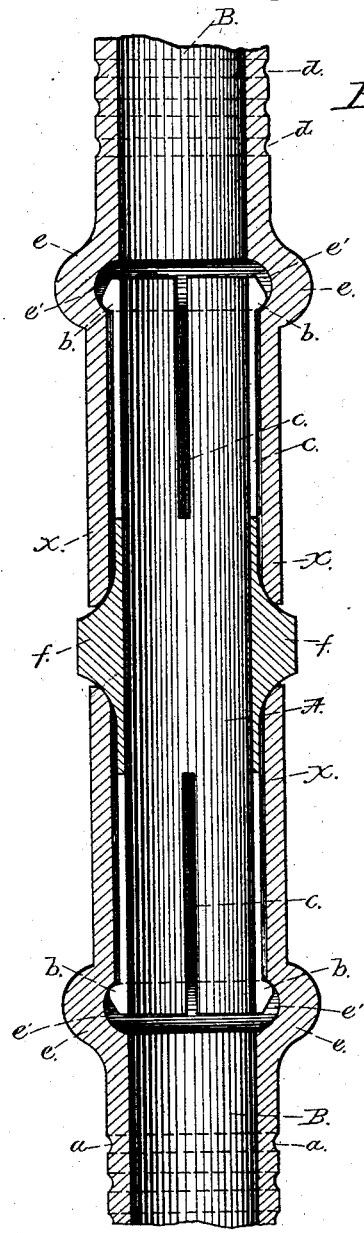

Figure 1 shows an isometric perspective of my newly-organized pipe or hose coupling, a section of the female part being broken away to show its operation. Fig. 2 is a longitudinal section of the same. Fig. 3 is a longitudinal sectional view, wherein the male part of the coupling is represented as double.

The nature of this invention relates to a novel and ingenious improvement in devices for coupling together pipe or hose; and its object is to furnish a coupling which will be very simple in construction, easy of operation, and well adapted to faithfully perform its functions under all circumstances.

To this end it consists of the constructions, adaptations, and combinations of mechanical parts, hereinafter specified and claimed.

Primarily this invention consists of two principal parts, which, for facility of description, I will denominate the "male" and "female."

Let the letter A indicate the male part and B the female. Other letters will be used to designate the details of their construction.

What I have designated as the male part of my invention consists of a hollow cylinder made of any suitable metal. At one end the cylinder is provided with circular grooves *a* to facilitate the operation of joining the part A to the end of a hose. At the other end is seen a bulbous enlargement, *b*, running around the outside circumference. Beginning at this end of the part A, cutting through the enlargement *b* and extending longitudinally some distance along the barrel of A, are slots *c*. The metal at this end is rendered tough and springy. The object of the slots is to permit the bulbous end to contract and draw together whenever it is subjected to compression.

I will now describe the female part B. This is also a metal cylinder. At one end it is provided with grooves *d* similar to the grooves *a*, and they are intended for the same purpose. At or about its middle point is a swelling, *e*, inside of which is a chamber, *e'*. Beyond the swelling the female part is a plain cylinder, indicated by the letter X.

The operation of the device above described is as follows: Assuming the parts A and B, respectively, firmly attached to the ends of sections of hose of any description—such as leather, rubber, canvas, &c—the operator takes a part in each hand, the bulb *b* is introduced into the bore of the plain cylinder X, and is forced steadily along through the cylinder until the bulb reaches the enlargement *e*. In its passage through the cylinder, as the cylinder's diameter is less than the diameter of the bulb, it is obvious that the bulb will be compressed. As soon, however, as the bulb enters the chamber *e'*, it springs out and locks the parts firmly together. That a good tight joint shall be made, the male part is provided with a circular shoulder, *f*, against which the end of the cylinder X smoothly fits.

So far the description has been confined to the action of my invention when used on a simple pipe or hose, as illustrated in Figs. 1 and 2 of the drawings.

In Fig. 3 I show a modification of the device, practically the same in all its details and principles, but having the bulbous and slotted parts of the male part double-ended. In said Fig. 3 the female parts B are just the same as that already described. The male part is the same in all its details, with the exception that the standing part carrying the grooves *a* is not used. The object of the device, as represented in this figure, is to furnish a device for coupling together such pipes or hose as are used in the equipment of air-brakes on railway-trains, or as a convenient coupler for joining the hose connecting a tender to a locomotive-boiler. In this the part A is an independent part and is joined to the parts B, just as above described. In using it for this purpose my design is that the female part shall be constant on the pipes at each end of a car, so that, no matter how the cars may be turned about, when brought together they can be readily connected by means of the double-end male coupler. In actual use a coupler as above described can be easily operated, because it can be put together or taken apart with great facility. All that is necessary for the operator to do is to insert the bulbous end of the male part into the bore of the female part and give a smart push and bring the parts into position, as shown in Fig. 2. On the other hand, the parts can be separated by a reversal of this operation—that is to say, by taking a part in each hand and giving a smart pull in a right line away from each other. The joint formed is very tight and does not become easily displaced, for unless the pulling strain comes in a straight line the lock formed by the swelling of the bulbous part $b$ into the chamber $e'$ is not easily broken. The double-end male part A is a construction of considerable importance in my scheme of invention, for by its use the female part can always be the standing part of the coupling on the end of a section of hose, and all that would be necessary to bring the two ends together would be unite them, as above described. In case of breakage it much simplifies repairs, because it does not have to be separated from its connection with the hose.

What I claim as my invention, and desire to secure by Letters Patent, is—

1. The hose-pipe coupling consisting, essentially, of two female parts made as described and brought into and held in union by means of a double-end male coupling, having at each end a bulbous enlargement and longitudinal slots, and operated substantially as herein set out.

2. In a hose-coupling, in combination, the female part B, provided with an internally-located chamber, $e'$, and a male part having slots $c$ and provided with the bulbous head $b$ to fit into said chamber $e'$, for the purpose of locking the parts together, substantially as herein set out.

3. In a hose-coupling, the combination of female parts B B and the herein-described male part provided at either end with a bulbous enlargement and longitudinal slots, substantially as herein set out.

In testimony that I claim the foregoing as my own I have affixed my signature in the presence of two witnesses.

MARSHAL L. BABB.

Witnesses:
H. G. BRIGGS,
FRANK S. WATERHOUSE.